United States Patent
Shade et al.

(10) Patent No.: US 11,300,487 B2
(45) Date of Patent: Apr. 12, 2022

(54) SYSTEM AND METHOD FOR CONTROLLING THE FLOW RATE OF DILUTION AIR THROUGH A POROUS WALL IN AN EXHAUST SAMPLING SYSTEM

(71) Applicant: AVL TEST SYSTEMS, INC., Plymouth, MI (US)

(72) Inventors: Benjamin C. Shade, Whitmore Lake, MI (US); James P. Williamson, Pinckney, MI (US); Jonathan D. Bushkuhl, Canton, MI (US)

(73) Assignee: AVL TEST SYSTEMS, INC., Plymouth, MI (US)

( * ) Notice: Subject to any disclaimer, the term of this patent is extended or adjusted under 35 U.S.C. 154(b) by 350 days.

(21) Appl. No.: 16/668,058

(22) Filed: Oct. 30, 2019

(65) Prior Publication Data
US 2020/0141844 A1    May 7, 2020

Related U.S. Application Data

(60) Provisional application No. 62/755,717, filed on Nov. 5, 2018.

(51) Int. Cl.
*G01N 1/38* (2006.01)
*G01N 15/06* (2006.01)

(52) U.S. Cl.
CPC ........... *G01N 1/38* (2013.01); *G01N 15/0618* (2013.01)

(58) Field of Classification Search
CPC ................. G01N 1/38; G01N 15/0618; G01N 2001/2255; G01N 1/2252;
(Continued)

(56) References Cited

U.S. PATENT DOCUMENTS

| 7,191,671 | B2 * | 3/2007 | Kreft | ................... | G01N 1/2205 |
|---|---|---|---|---|---|
| | | | | | 73/863.81 |
| 2015/0097048 | A1 * | 4/2015 | Linnell | .................. | B05B 1/262 |
| | | | | | 239/8 |

(Continued)

OTHER PUBLICATIONS

Dynamometer Drive Schedules, Vehicle and Fuel Emissions Testing. Jan. 31, 2017, www.epa.gov/vehicle-and-fuel-emissions-testing/dynamometer-drive-schedules, 3 pages.
(Continued)

*Primary Examiner* — David Z Huang
(74) *Attorney, Agent, or Firm* — Honigman LLP; Matthew H. Szalach

(57) ABSTRACT

An example of an emissions test system according to the principles of the present disclosure includes a dilution tunnel and a flow control module. Exhaust gas is mixed with dilution gas in the dilution tunnel. The dilution tunnel is configured to receive dilution gas flowing in an axial direction relative to the dilution tunnel and dilution gas flowing in a radial direction relative to the dilution tunnel. The flow control module is configured to adjust the rate of the dilution gas flow in the radial direction based on at least one of a concentration of pollutant particles in the exhaust gas, a size of pollutant particles in the exhaust gas, a concentration of a gaseous emission in the exhaust gas, a type of fuel combusted by an engine producing the exhaust gas, and a rate of fuel flow to cylinders of the engine.

25 Claims, 5 Drawing Sheets

(58) Field of Classification Search
CPC ........... G01N 2015/0046; G01N 15/02; G01N 15/06; G01N 33/0004; G01F 1/76
See application file for complete search history.

(56) References Cited

U.S. PATENT DOCUMENTS

2015/0316447 A1* 11/2015 Kumagai ........... G01N 33/0018
                                                    73/114.71
2016/0273438 A1*  9/2016 Otsuki ................ G01M 15/102

OTHER PUBLICATIONS

E-CFR §1066.815 Exhaust emission test procedures for FTP testing. Emission Standards Reference Guide EPA Federal Test Procedure (FTP). Feb. 23, 2017, www.epa.gov/emission-standards-reference-guide/epa-federal-test-procedure-ftp., 2 pages.
Ryan, C., McDonald, J., Silvis, W., Williamson, J. et al., "CMS—An Evolution of the CVS—A Full Flow, Constant Mass Flow, Sampling System," SAE Technical Paper 2006-01-1514, 2006, 14 pages.

\* cited by examiner

SYSTEM AND METHOD FOR CONTROLLING THE FLOW RATE OF DILUTION AIR THROUGH A POROUS WALL IN AN EXHAUST SAMPLING SYSTEM

CROSS-REFERENCE TO RELATED APPLICATIONS

This application claims the benefit of U.S. Provisional Application No. 62/755,717, filed on Nov. 5, 2018. The entire disclosure of the application referenced above is incorporated herein by reference.

FIELD

The present disclosure relates to emissions test systems, and more particularly, to systems and methods for controlling the flow rate of dilution air through a porous wall in an exhaust sampling system.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Emissions test systems collect exhaust gas produced by an engine and measure the concentrations of emissions in the exhaust gas. The concentration of an emission measured during a period is multiplied by the mass flow rate of exhaust gas during that period to obtain the mass flow rate of the emission. The mass flow rate of the emission is then multiplied by the duration of the period to obtain the total mass of the emission in the exhaust gas produced by the engine during the period.

A constant volume sampling (CVS) system is a type of emissions test system that enables determining the mass of emissions in exhaust gas without measuring the flow rate of the exhaust gas, which simplifies emission mass determinations. A CVS system typically includes a dilution tunnel in which exhaust gas and a dilution gas are mixed, a sample probe that directs a sample of the diluted exhaust gas from the dilution tunnel to a sample collector, and a blower disposed downstream of the dilution tunnel. The blower draws a constant volume of diluted exhaust gas through the dilution tunnel. Thus, the exhaust gas flow rate may be determined by subtracting the flow rate of the dilution gas from the flow rate of the diluted exhaust gas.

In a typical CVS system, the dilution tunnel includes a pipe or tube that forms the outer wall of the dilution tunnel, and exhaust gas is introduced into the dilution tunnel along the central longitudinal axis of the pipe. Dilution gas is also introduced into the dilution tunnel along the same axis, and the exhaust gas is mixed with the dilution gas in an annular flow pattern. After the mixture of exhaust gas and dilution gas has passed through a sufficient length of the dilution tunnel (e.g., 10 times the diameter of the dilution tunnel), the mixture is presumed to be homogenous for emissions sampling.

SUMMARY

An example of an emissions test system according to the principles of the present disclosure includes a dilution tunnel and a flow control module. Exhaust gas is mixed with dilution gas in the dilution tunnel. The dilution tunnel is configured to receive dilution gas flowing in an axial direction relative to the dilution tunnel and dilution gas flowing in a radial direction relative to the dilution tunnel. The flow control module is configured to adjust the rate of the dilution gas flow in the radial direction based on at least one of a concentration of pollutant particles in the exhaust gas, a size of pollutant particles in the exhaust gas, a concentration of a gaseous emission in the exhaust gas, a type of fuel combusted by an engine producing the exhaust gas, and a rate of fuel flow to cylinders of the engine.

In one example, the flow control module is configured to adjust the rate of the dilution gas flow in the radial direction based on the concentration of pollutant particles in the exhaust gas.

In one example, the flow control module is configured to: increase the rate of the dilution gas flow in the radial direction when the concentration of pollutant particles in the exhaust gas increases; and decrease the rate of the dilution gas flow in the radial direction when the concentration of pollutant particles in the exhaust gas decreases.

In one example, the flow control module is configured to adjust the rate of the dilution gas flow in the radial direction based on a total number of pollutant particles in the exhaust gas having a size greater than a predetermined size.

In one example, the flow control module is configured to: increase the rate of the dilution gas flow in the radial direction when the total number of pollutant particles in the exhaust gas increases; and decrease the rate of the dilution gas flow in the radial direction when the total number of pollutant particles in the exhaust gas decreases.

In one example, the flow control module is configured to adjust the rate of the dilution gas flow in the radial direction based on the type of fuel combusted by the engine.

In one example, the flow control module is configured to: adjust the rate of the dilution gas flow in the radial direction to a first value when a first type of fuel is combusted by the engine; and adjust the rate of the dilution gas flow in the radial direction to a second value that is greater than the first value when a second type of fuel is combusted by the engine, where combustion of the second type of fuel produces more water per mass of fuel combusted relative to combustion of the first type of fuel.

In one example, the flow control module is configured to adjust the rate of the dilution gas flow in the radial direction based on the rate of fuel flow to the cylinders.

In one example, the flow control module is configured to: increase the rate of the dilution gas flow in the radial direction when the rate of fuel flow to the cylinders increases; and decrease the rate of the dilution gas flow in the radial direction when the rate of fuel flow to the cylinders decreases.

In one example, the dilution tunnel includes an inner pipe and an outer pipe surrounding the inner pipe, the inner pipe having an inlet end configured to receive the dilution gas flowing in the axial direction, the inner pipe having pores extending through the inner pipe in the radial direction and configured to receive the dilution gas flowing in the radial direction.

In one example, the dilution tunnel further includes an orifice plate disposed at the inlet end thereof and defining an orifice through which the dilution gas flowing in the axial direction passes.

In one example, the emissions test system further includes a plenum configured to deliver the dilution gas flowing in the radial direction through the outer pipe.

In one example, the plenum includes: at least one line extending in the radial direction to the outer pipe; and at least one valve disposed in the at least one line, where the flow control module is configured to adjust the position of the at least one valve to adjust the rate of dilution gas flow in the radial direction through the at least one line.

In one example, the at least one line includes a plurality of lines extending in the radial direction to the outer pipe, and the at least one valve includes a plurality of valves that are each disposed in one of the plurality of lines, where the flow control module is configured to adjust the positions of the plurality of valves to adjust the rates of dilution gas flow in the radial direction through the plurality of lines.

In one example, the flow control module is configured to adjust the rate of dilution gas flow in the radial direction through each line in the plurality of lines by the same amount in response to a change in at least one of the concentration of pollutant particles in the exhaust gas, the size of pollutant particles in the exhaust gas, the type of fuel combusted by the engine, and the rate of fuel flow to cylinders of the engine.

An example of an emissions test method according to the principles of the present disclosure includes delivering exhaust gas to a dilution tunnel, delivering dilution gas to the dilution tunnel in an axial direction relative to the dilution tunnel, delivering dilution gas to the dilution tunnel in a radial direction relative to the dilution tunnel, and adjusting the rate of the dilution gas flow in the radial direction based on at least one of a concentration of pollutant particles in the exhaust gas, a size of pollutant particles in the exhaust gas, a concentration of a gaseous emission in the exhaust gas, a type of fuel combusted by an engine producing the exhaust gas, and a rate of fuel flow to cylinders of the engine.

In one example, the emissions test method further includes adjusting the rate of the dilution gas flow in the radial direction based on the concentration of pollutant particles in the exhaust gas.

In one example, the emissions test method further includes increasing the rate of the dilution gas flow in the radial direction when the concentration of pollutant particles in the exhaust gas increases, and decreasing the rate of the dilution gas flow in the radial direction when the concentration of pollutant particles in the exhaust gas decreases.

In one example, the emissions test method further includes adjusting the rate of the dilution gas flow in the radial direction based on a total number of pollutant particles in the exhaust gas having a size greater than a predetermined size.

In one example, the emissions test method further includes increasing the rate of the dilution gas flow in the radial direction when the total number of pollutant particles in the exhaust gas increases, and decreasing the rate of the dilution gas flow in the radial direction when the total number of pollutant particles in the exhaust gas decreases.

In one example, the emissions test method further includes adjusting the rate of the dilution gas flow in the radial direction based on the type of fuel combusted by the engine.

In one example, the emissions test method further includes adjusting the rate of the dilution gas flow in the radial direction to a first value when a first type of fuel is combusted by the engine, and adjusting the rate of the dilution gas flow in the radial direction to a second value that is greater than the first value when a second type of fuel is combusted by the engine, where combustion of the second type of fuel produces more water per mass of fuel combusted relative to combustion of the first type of fuel.

In one example, the emissions test method further includes adjusting the rate of the dilution gas flow in the radial direction based on the rate of fuel flow to the cylinders.

In one example, the emissions test method further includes increasing the rate of the dilution gas flow in the radial direction when the rate of fuel flow to the cylinders increases, and decreasing the rate of the dilution gas flow in the radial direction when the rate of fuel flow to the cylinders decreases.

In one example, the emissions test method further includes delivering dilution gas through a plurality of lines extending in the radial direction to the dilution tunnel and spaced apart from one another in the axial direction relative to the dilution tunnel, and adjusting the rate of dilution gas flow in the radial direction through each line in the plurality of lines by the same amount in response to a change in at least one of the concentration of pollutant particles in the exhaust gas, the size of pollutant particles in the exhaust gas, the concentration of the gaseous emission in the exhaust gas, the type of fuel combusted by the engine, and the rate of fuel flow to cylinders of the engine.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
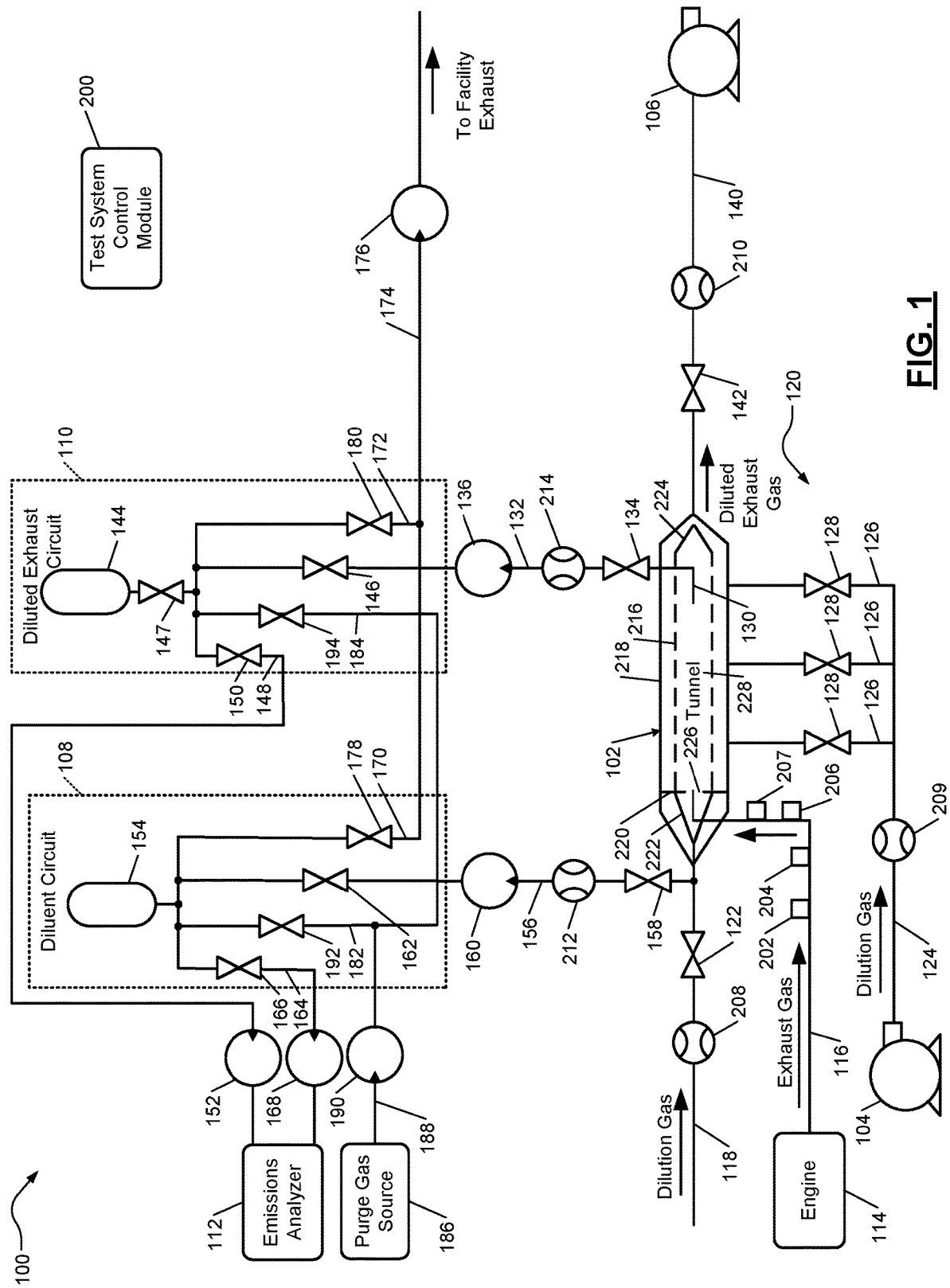
FIG. 1 is a schematic of an example emissions test system according to the present disclosure.

As discussed above, CVS systems typically introduce dilution gas into a dilution tunnel in an axial direction relative to the dilution tunnel (e.g., along a longitudinal axis of the dilution tunnel). Some CVS systems introduce dilution gas into the dilution tunnel in a radial direction relative to the dilution tunnel in addition to introducing dilution gas into the dilution tunnel in the axial direction. Such CVS systems typically include a solid tube that forms the outer wall of the dilution tunnel, and a porous tube that is disposed inside of the solid tube and acts as a manifold for the radial dilution gas flow.

Introducing dilution gas into the dilution tunnel in the radial direction keeps the exhaust plume away from the wall of the dilution tunnel, which reduces or eliminates the loss of particulate matter and organic compounds in the dilution tunnel and thereby improves the accuracy of the emissions tests. In addition, introducing dilution gas into the dilution tunnel in the radial direction may decrease the mixing length required to achieve a homogenous emissions sample. However, improvements may be made in the methods for determining a target rate of radial dilution gas flow to the dilution tunnel in order to avoid contamination or condensation at the dilution tunnel wall.

A conservative approach is to fix the rate of radial dilution gas flow to the dilution tunnel at a high level to ensure that both contamination and condensation at the dilution tunnel wall is prevented. However, this approach is energy intensive due to the higher pressure drop through the porous wall of the dilution tunnel. Thus, a system and method according to the present disclosure optimizes the rate of radial dilution gas flow to the dilution tunnel to prevent contamination/condensation at the dilution tunnel wall while minimizing the total energy consumption required to do so.

In one example, the system and method adjusts the rate of radial dilution gas flow to the dilution tunnel based on the concentration of particles in the exhaust gas and/or the sizes of the particles in the exhaust gas. The system and method may assume that, as the concentration of particles increases, the number of larger particles also increases and therefore the particles have more inertia that may force them toward the dilution tunnel wall. Thus, the system and method may increase the rate of radial dilution flow when the particle concentration increases, and the system and method may decrease the rate of radial dilution flow when the particle concentration decreases.

In another example, the system and method adjusts the rate of radial dilution gas flow to the dilution tunnel based on the type of fuel combusted by the engine and/or the rate at which fuel flows to cylinders of the engine. Engines that combust natural gas typically have low particle emission levels and therefore should not contaminate the CVS system. However, these engines typically combust a stoichiometric mixture of natural gas and air, which produces exhaust gas having high amounts of water. Therefore, condensation of the water in the CVS system is a major concern. To address this concern, the system and method may use a higher rate of radial dilution gas flow for natural gas engines relative to the rates of radial dilution gas flow used for gasoline or diesel engines. The system and method may use the fuel flow rate to trim or adjust the rate of radial dilution gas flow since the amount of water in the exhaust gas increases or decreases as the fuel flow rate respectively increase or decreases.

Referring now to FIG. 1, an emissions test system 100 includes a dilution tunnel 102, a dilution gas blower 104, a diluted exhaust blower 106, a diluent circuit 108, a diluted exhaust circuit 110, and an emissions analyzer 112. The dilution tunnel 102 receives exhaust gas produced by an engine 114 through an exhaust gas supply line 116. The dilution tunnel 102 receives dilution gas flowing in an axial direction to the dilution tunnel 102 through a dilution gas supply line 118. The dilution tunnel 102 receives dilution gas flowing in a radial direction to the dilution tunnel 102 through a dilution gas plenum 120. In the dilution tunnel 102, the exhaust gas from the engine 114 is mixed with the dilution gas flowing in the axial direction and the dilution gas flowing in the radial direction.

The diluted exhaust blower 106 is disposed downstream of the dilution tunnel 102, and the diluted exhaust blower 106 draws dilution gas through the dilution gas supply line 118 and into the dilution tunnel 102. The dilution gas may be ambient air, in which case the diluted exhaust blower 106 may draw the dilution gas from the surrounding environment. The diluted exhaust blower 106 may be a variable speed blower, and the speed of the diluted exhaust blower 106 may be adjusted to adjust the rate at which dilution gas flows through the dilution tunnel 102. Additionally or alternatively, a valve 122 may be disposed in the dilution gas supply line 118, and the position of the valve 122 may be adjusted to adjust the flow rate of dilution gas into the dilution tunnel 102 via the dilution gas supply line 118.

In various implementations, the emissions test system 100 may include a second dilution gas blower (not shown) disposed in the dilution gas supply line 118 upstream of the dilution tunnel 102 instead of or in addition to the diluted exhaust blower 106. The second dilution gas blower may be a variable speed blower, and the speed of the second dilution gas blower may be adjusted to adjust the rate at which dilution gas flows into the dilution tunnel 102 via the dilution gas supply line 118. The diluted exhaust blower 106 and/or the second dilution gas blower may be controlled to force a constant volume of diluted exhaust gas through the dilution tunnel 102. In this regard, the emissions test system 100 may be a CVS system.

The dilution gas plenum 120 includes a dilution gas supply line 124 extending in the axial direction from the dilution gas blower 104, dilution gas supply lines 126 extending in the radial direction from the dilution gas supply line 124 to the dilution tunnel 102, and valves 128 that are each disposed in one of the dilution gas supply lines 126. The dilution gas blower 104 sends dilution gas through the dilution gas supply line 124, through the dilution gas supply lines 126, and into the dilution tunnel 102. The dilution gas may be ambient air, in which case the dilution gas blower 104 may draw the dilution gas from the surrounding environment. The dilution gas blower 104 may be a variable speed blower, and the speed of the dilution gas blower 104 may be adjusted to adjust the rate at which dilution gas flows through the dilution gas supply lines 126. Additionally or alternatively, the positions of the valves 128 may be adjusted to adjust the flow rate of dilution gas through the dilution gas supply lines 126. In one example, the dilution gas blower 104 is operated at a constant speed, and the positions of the valves 128 are adjusted to adjust the flow rate of dilution gas through the dilution gas supply lines 126.

A diluted exhaust sample probe 130 extracts a sample of the diluted exhaust gas from the dilution tunnel 102, and a diluted exhaust supply line 132 supplies the diluted exhaust gas sample from the diluted exhaust sample probe 130 to the diluted exhaust circuit 110. A diluted exhaust extraction valve 134 may be disposed in the diluted exhaust supply line 132, and the position of the diluted exhaust extraction valve 134 may be adjusted to adjust the rate at which the diluted exhaust gas sample is extracted through the diluted exhaust sample probe 130. Additionally or alternatively, a diluted exhaust extraction pump 136 may be disposed in the diluted exhaust supply line 132, and the speed of the diluted exhaust extraction pump 136 may be adjusted to adjust the rate at which the diluted exhaust gas sample is extracted through the diluted exhaust sample probe 130. In one example, the diluted exhaust extraction pump 136 is operated at a constant speed, and the position of the diluted exhaust extraction valve 134 is adjusted to adjust the extraction rate of the diluted exhaust gas through the diluted exhaust sample probe 130. The diluted exhaust sample probe 130, the diluted exhaust supply line 132, the diluted exhaust extraction valve 134, and the diluted exhaust extraction pump 136 may be considered part of the diluted exhaust circuit 110.

The portion of the diluted exhaust gas that is not extracted by the diluted exhaust sample probe 130 is expelled from the dilution tunnel 102 to the atmosphere, or to a facility exhaust system, through a dilution tunnel exhaust line 140. The speed of the diluted exhaust blower 106 may be adjusted to adjust the rate at which the diluted exhaust gas flows through the dilution tunnel 102 and the dilution tunnel exhaust line 140. Additionally, a valve 142 may be disposed in the dilution tunnel exhaust line 140, and the valve 142 may be opened or closed to allow or prevent the flow of the diluted exhaust gas through the dilution tunnel exhaust line 140.

The diluted exhaust circuit 110 includes a diluted exhaust sample collector 144 that collects the diluted exhaust gas sample extracted by the diluted exhaust sample probe 130. The diluted exhaust sample collector 144 may be a sample bag or a sample filter. A diluted exhaust fill valve 146 may be disposed in the diluted exhaust supply line 132, and the diluted exhaust fill valve 146 may be opened or closed to allow or prevent the flow of the diluted exhaust gas sample to the diluted exhaust sample collector 144. Although only one diluted exhaust sample collector 144 is shown, the emissions test system 100 may include a plurality of diluted exhaust sample collectors, and each diluted exhaust sample collector may collect a sample of diluted exhaust gas during one test phase of an emissions test schedule. In addition, a sample collector valve 147 may be disposed at or near the inlet/outlet of each diluted exhaust sample collector to control the flow of diluted exhaust gas into or out of each diluted exhaust sample collector.

The emissions analyzer 112 analyzes the diluted exhaust gas sample collected by the diluted exhaust sample collector 144 to determine the concentrations of emissions contained therein. The emissions analyzer 112 may be a gaseous emissions analyzer that measures the concentrations of gaseous emissions such as carbon monoxide, carbon dioxide, nitrogen oxides, and hydrocarbon. The diluted exhaust gas sample is sent from the diluted exhaust sample collector 144 to the emissions analyzer 112 through a diluted exhaust read line 148. A diluted exhaust read valve 150 may be disposed in the diluted exhaust read line 148, and the diluted exhaust read valve 150 may be opened or closed to allow or prevent the flow of the diluted exhaust gas sample from the first clean diluted exhaust sample collector 144 to the emissions analyzer 112. Additionally or alternatively, a diluted exhaust read pump 152 may be disposed in the diluted exhaust read line 148, and the speed of the diluted exhaust read pump 152 may be adjusted to adjust the rate at which the diluted exhaust gas sample flows from the diluted exhaust sample collector 144 to the emissions analyzer 112.

The diluent circuit 108 includes a diluent sample collector 154 that collect a sample of dilution gas flowing through the dilution gas supply line 118. A diluent sample supply line 156 supplies the dilution gas sample from the dilution gas supply line 118 to the diluent sample collector 154. A diluent extraction valve 158 may be disposed in the diluent sample supply line 156, and the position of the diluent extraction valve 158 may be adjusted to adjust the rate at which the dilution gas sample is extracted from the dilution gas supply line 118. Additionally or alternatively, a diluent extraction pump 160 may be disposed in the diluent sample supply line 156, and the speed of the diluent extraction pump 160 may be adjusted to adjust the rate at which the dilution gas sample is extracted from the dilution gas supply line 118. In one example, the diluent extraction pump 160 is operated at a constant speed, and the position of the diluent extraction valve 158 is adjusted to adjust the extraction rate of the dilution gas sample. The diluent sample supply line 156, the diluent extraction valve 158, and the diluent extraction pump 160 may be considered part of the diluent circuit 108.

The diluent sample collector 154 may be a sample bag or a sample filter. A diluent fill valve 162 may be disposed in the diluent sample supply line 156, and the diluent fill valve 162 may be opened or closed to allow or prevent the flow of the dilution gas sample to the diluent sample collector 154. Although only one diluent sample collector 154 is shown, the emissions test system 100 may include a plurality of diluent sample collectors, and each diluent sample collector may collect a sample of dilution gas during one test phase of an emissions test schedule.

The emissions analyzer 112 analyzes the dilution gas sample collected by the diluent sample collector 154 to determine the concentration of emissions contained therein. The emissions analyzer 112 may account for the concentration of emissions contained in the dilution gas sample when determining the concentration of emissions contained in the diluted exhaust gas sample. For example, if the mass of dilution gas in the diluted exhaust gas sample is equal to the mass of dilution gas in the dilution gas sample, the emissions analyzer 112 may subtract the concentration of emissions in the dilution gas sample from the concentration of emissions in the diluted exhaust gas sample to obtain the concentration of emissions in the exhaust gas contained in the diluted exhaust gas sample.

The diluted exhaust gas sample is sent from the diluent sample collector 154 to the emissions analyzer 112 through a diluent read line 164. A diluent read valve 166 may be disposed in the diluent read line 164, and the diluent read valve 166 may be opened or closed to allow or prevent the flow of the dilution gas sample from the diluent sample collector 154 to the emissions analyzer 112. Additionally or alternatively, a diluent read pump 168 may be disposed in the diluent read line 164, and the speed of the diluent read pump 168 may be adjusted to adjust the rate at which the dilution gas sample flows from the diluent sample collector 154 to the emissions analyzer 112.

The emissions test system 100 further includes a diluent vent line 170 and a diluted exhaust vent line 172 for venting gas from the diluent sample collector 154 and the diluted exhaust sample collector 144, respectively. In the example shown, the diluent vent line 170 and the diluted exhaust vent line 172 converge into a single vent line 174 that extends to the facility exhaust system, and a vent pump 176 is disposed in the vent line 174 to draw gas through the vent line 174. In various implementations, the diluent vent line 170 and the diluted exhaust vent line 172 may not converge into a single vent line and/or may vent gas directly to the atmosphere. In addition, a vent pump (not shown) may be disposed in each of the vent lines 170, 172 in place of the vent pump 176.

A diluent vent valve 178 may be disposed in the diluent vent line 170, and the diluent vent valve 178 may be opened or closed to allow or prevent the flow of the dilution gas sample from the diluent sample collector 154 to the dilution tunnel exhaust line 140. Similarly, a diluted exhaust vent valve 180 may be disposed in the diluted exhaust vent line 172, and the diluted exhaust vent valve 180 may be opened or closed to allow or prevent the flow of the diluted exhaust gas sample from the diluted exhaust sample collector 144 to the dilution tunnel exhaust line 140.

The emissions test system 100 further includes a diluent purge line 182 and a diluted exhaust purge line 184 for proving purge gas to the diluent sample collector 154 and the diluted exhaust sample collector 144, respectively. The purge gas may be a clean gas, such as ambient air that has not been mixed with exhaust gas. The purge gas is provided by a purge gas source 186, which may simply be the atmosphere or may be a filter that filters ambient air to yield the purge gas. In the implementation shown, a single purge line 188 extends from the purge gas source 186 and splits into the diluent purge line 182 and the diluted exhaust purge line 184, and a purge pump 190 is disposed in the purge line 188 to send purge gas through the purge line 188. In various implementations, the diluent purge line 182 and the diluted exhaust purge line 184 may extend from the purge gas source 186 independent from one another, and a purge pump (not shown) may be disposed in each of the purge lines 182, 184.

A diluent purge valve 192 may be disposed in the diluent purge line 182, and the diluent purge valve 192 may be opened or closed to allow or prevent the flow of purge gas from the purge gas source 186 to the diluent sample collector 154. Similarly, a diluted exhaust purge valve 194 may be disposed in the diluted exhaust purge line 184, and the diluted exhaust purge valve 194 may be opened or closed to allow or prevent the flow of purge gas from the purge gas source 186 to the diluted exhaust sample collector 144.

The emissions test system 100 further includes a test system control module 200 that controls various actuators of the emissions test system 100 based on signals received from various sensors of the emissions test system 100. The actuators of the emissions test system 100 include the blowers 104, 106, the valves 122, 128, 134, 142, 146, 150, 158, 162, 166, 178, 180, 192, 194, and the pumps 136, 152, 160, 168, 176, 190. The sensors of the emissions test system 100 include the emissions analyzer 112, a particle concentration sensor 202, a particle counter 204, a particle sizer 206, a gaseous emission concentration sensor 207, an axial diluent flow meter 208, a radial diluent flow meter 209, a diluted exhaust flow meter 210, a diluent sample flow meter 212, and a diluted sample flow meter 214. The diluent sample flow meter 212 and the diluted sample flow meter 214 may be considered part of the diluent circuit 108 and the diluted exhaust circuit 110, respectively.

The test system control module 200 outputs various control signals to control the actuators of the emissions test system 100. The test system control module 200 outputs a blower control signal (FIG. 3) to each of the blowers 104, 106, and the blower control signal indicates a target duty cycle or target speed of the respective blower. The test system control module 200 outputs a valve control signal (FIG. 3) to each of the valves 122, 128, 134, 142, 146, 150, 158, 162, 166, 178, 180, 192, 194, and the valve control signal indicates a target position of the respective valve. The test system control module 200 outputs a pump control signal (FIG. 3) to each of the pumps 136, 152, 160, 168, 176, 190, and the pump control signal indicates a target duty cycle or target speed of the respective pump.

The particle concentration sensor 202 measures the concentration of particles in exhaust gas flowing through the exhaust gas supply line 116 and outputs a particle concentration signal (FIG. 3) indicating the particle concentration. The particle concentration sensor 202 may be a mass concentration sensor such as the AVL Micro Soot$^{Sensor\text{TM}}$, in which case the particle concentration may be a mass concentration indicating a ratio of a mass of pollutant particles in the exhaust gas to a total mass of the exhaust gas. Alternatively, the particle concentration sensor 202 may be a number concentration sensor, in which case the particle concentration may be a number concentration indicating a ratio of a number of pollutant particles in the exhaust gas to a total number of particles in the exhaust gas.

The particle counter 204 counts the number of pollutant particles in exhaust gas flowing through the exhaust gas supply line 116 and outputs a particle count signal (FIG. 3) indicating the particle count. The particle counter 204 may be the AVL Particle Counter™. The particle sizer 206 measures the sizes of pollutant particles in exhaust gas flowing through the exhaust gas supply line 116 and outputs a particle size signal (FIG. 3) indicating the particle sizes. The gaseous emission concentration sensor 207 measures the concentration of a gaseous emission (e.g., water vapor, carbon dioxide) in exhaust gas flowing through the exhaust gas supply line 116 and outputs a gaseous emission concentration signal (FIG. 3) indicating the gaseous emission concentration. The particle concentration sensor 202, the particle counter 204, the particle sizer 206, and the gaseous emission concentration sensor 207 respectively output the particle concentration signal, the particle count signal, the particle size signal, and the gaseous emission concentration signal to the test system control module 200.

The axial diluent flow meter 208 measures the rate of dilution gas flow in the axial direction through the dilution gas supply line 118 and outputs an axial diluent flow rate signal (FIG. 3) indicating the axial diluent flow rate. The radial diluent flow meter 209 measures the rate of dilution gas flow in the axial direction through the dilution gas supply line 124, which is equal to the sum of the rates of the dilution gas flow in the radial direction through the dilution gas supply lines 126. The radial diluent flow meter 209 outputs a radial diluent flow rate signal (FIG. 3) indicating the radial diluent flow rate. The diluted exhaust flow meter 210 measures the flow rate of diluted exhaust gas in the dilution tunnel exhaust line 140 and outputs a diluted exhaust flow rate signal (FIG. 3) indicating the diluted exhaust flow rate.

In various implementations, the diluted exhaust flow meter 210 may include one or more venturi nozzles, and the valve 142 may include one or more valves that control the flow of the diluted exhaust gas through a corresponding one of the venturi nozzles. For example, each valve may be opened or closed to allow or prevent the flow of the diluted exhaust through a corresponding one of the venture nozzles. In this way, the position of the valves may be adjusted to adjust the rate at which the diluted exhaust gas flows through the dilution tunnel 102 and the dilution tunnel exhaust line 140.

The diluent sample flow meter 212 measures the flow rate of the dilution gas sample flowing through the diluent sample supply line 156 and outputs a diluent sample flow rate signal indicating the diluent sample flow rate. The diluted sample flow meter 214 measures the flow rate of the diluted exhaust gas sample flowing through the diluted exhaust supply line 132 and outputs a diluted sample flow rate signal indicating the diluted sample flow rate. The axial diluent flow meter 208, radial diluent flow meter 209, the diluted exhaust flow meter 210, the diluent sample flow meter 212, and the diluted sample flow meter 214 output their respective flow rate signals to the test system control module 200.

The test system control module 200 adjusts the rate at which dilution gas flows in the radial direction through the dilution gas supply lines 126 to prevent contamination of the inner surface of the dilution tunnel 102 and to prevent condensation from forming on the inner surface. The test system control module 200 adjusts the radial diluent flow rate based on one or more (e.g., all) of the following parameters: the particle concentration, the particle count, the particle sizes, a type of fuel combusted by the engine 114, and a rate at which fuel is delivered to cylinders of the engine 114. In one example, the test system control module 200 uses the particle concentration and the particle count to determine the total number of pollutant particles that are greater than a predetermined size, and increases or decreases the radial diluent flow rate when the total number respectively increases or decreases. In another example, the test system control module 200 selects a target flow rate from a plurality of predetermined flow rates based on the fuel type, sets the radial diluent flow rate to the target flow rate, and then adjusts the radial diluent flow rate based on the fuel delivery rate.

Figure 2:
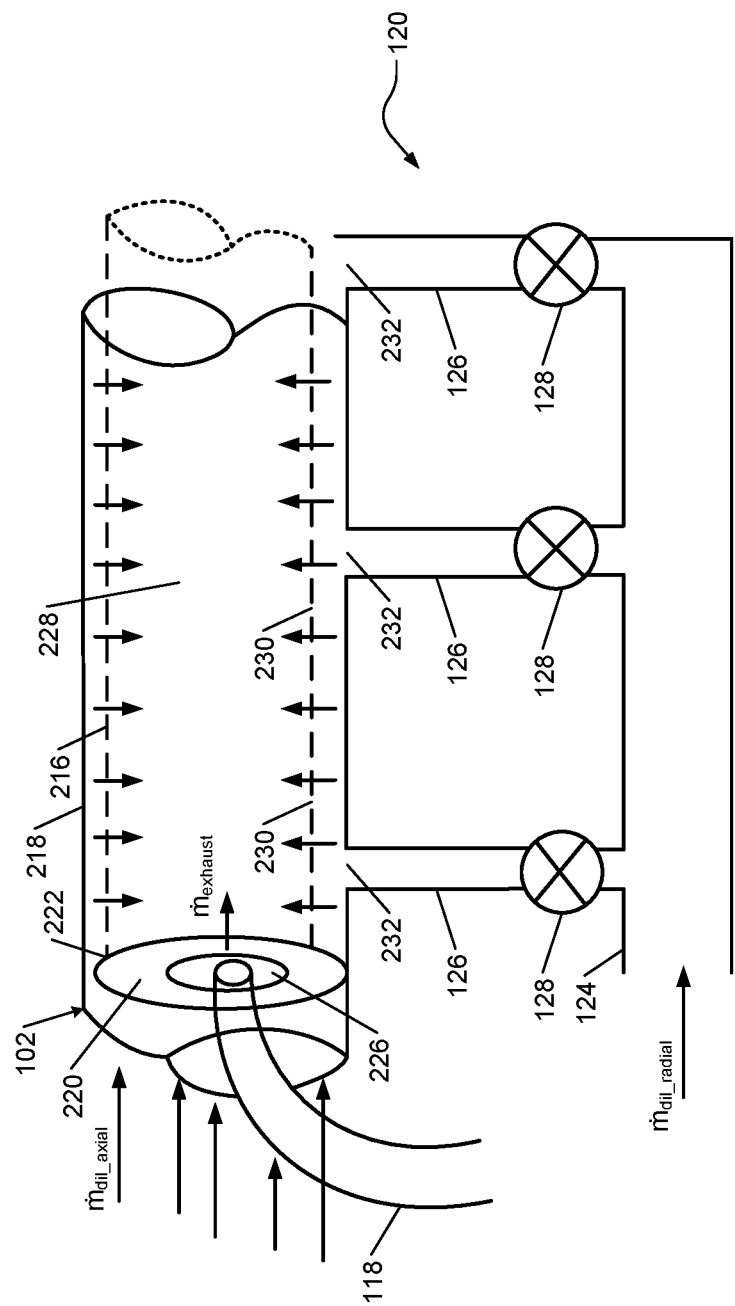
FIG. 2 is a schematic of an example dilution tunnel including an outer pipe and an inner pipe having a porous wall according to the present disclosure.

With additional reference to FIG. 2, the dilution tunnel 102 includes an inner pipe 216, an outer pipe 218 surrounding the inner pipe 216, and an orifice plate 220 disposed within the outer pipe 218. The inner pipe 216 has an inlet end 222 and an outlet end 224 (FIG. 1). The orifice plate 220 is disposed at or near the inlet end 222 of the inner pipe 216 and defines an orifice 226. Exhaust gas flowing through the exhaust gas supply line 116 (labelled $\dot{m}_{exhaust}$ in FIG. 2) and dilution gas flowing axially through dilution gas supply line 118 (labelled $\dot{m}_{dil\_axial}$ in FIG. 2) enter an interior 228 of the inner pipe 216 through the orifice 226 in the orifice plate 220.

As best shown in FIG. 2, the inner pipe 216 has a plurality of pores 230 that extend radially through the inner pipe 216, and the outer pipe 218 has a plurality of openings 232 that extend radially through the outer pipe 218. Dilution gas flowing radially through the dilution gas supply lines 126 (labelled $\dot{m}_{dil\_radial}$ in FIG. 2) enters the interior 228 of the inner pipe 216 through the openings 232 in the outer pipe 218 and the pores 230 in the inner pipe 216. The number of openings 232 in the outer pipe 218 may be equal to the number of dilution gas supply lines 126, each of the openings 232 may be aligned with one of the dilution gas supply lines 126, and the diameter of the openings 232 may be equal to the diameter of the dilution gas supply lines 126. In contrast, the number of the pores 230 in the inner pipe 216 may be significantly greater than the number of dilution gas supply lines 126, the pores 230 may be uniformly distributed along the length and circumference of the inner pipe 216, and the diameter of the pores 230 may be less than the diameter of the dilution gas supply lines 126. The inner pipe 216 may be referred to as a porous wall.

The pores 230 in the inner pipe 216 may be formed by drilling holes therein. Alternatively, the inner pipe 215 may be sintered from a metal powder to yield a plurality of porous layers that are stacked on top of one another form a porous tube.

Figure 3:
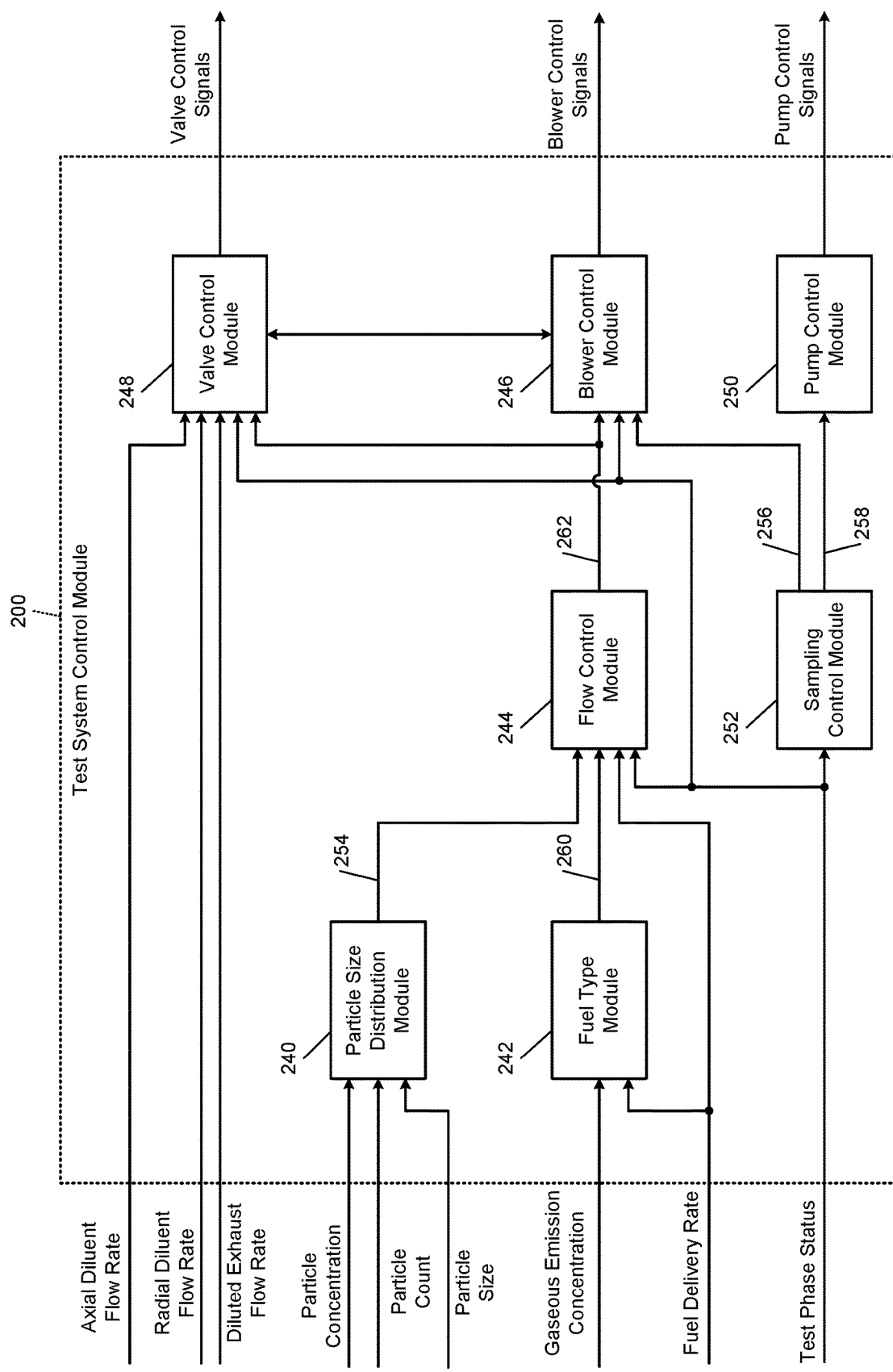
FIG. 3 is a functional block diagram of an example test system control module according to the present disclosure.

Referring now to FIG. 3, an example implementation of the test system control module 200 includes a particle size distribution module 240, a fuel type module 242, a flow control module 244, a blower control module 246, a valve control module 248, a pump control module 250, and a sampling control module 252. The particle size distribution module 240 determines the distribution of the sizes of pollutant particles in exhaust gas flowing through the exhaust gas supply line 116. For example, the particle size distribution module 240 may determine how many pollutant particles fall within predetermined size ranges at any given moment in time. The particle size distribution module 240 outputs a signal 254 indicating the particle size distribution.

The particle size distribution module 240 may determine the particle size distribution based on the particle concentration (e.g., the mass concentration) measured by the particle concentration sensor 202 and the particle count measured by the particle counter 204. The particle size distribution module 240 may determine the particle size distribution based on a predetermined relationship between the particle concentration, the particle count, and the particle size distribution. For example, the particle size distribution module 240 may assume that the particle size distribution has a bell curve shape when plotted with respect to an x-axis that represents particle size and a y-axis that represents particle count. Thus, the largest number of particles may fall within a mean or median size range, and the smallest number of particles may fall within the smallest and largest size ranges. The particle size distribution module 240 may determine the height of the bell curve based on the particle count, and the particle size distribution module 240 may shift the bell curve to the right or left when the particle concentration increases or decreases.

Additionally or alternatively, the particle size distribution module 240 may determine the particle size distribution based on the particle sizes measured by the particle sizer 206 and the particle count measured by the particle counter 204. For example, the signal output by the particle sizer 206 may indicate the percentage of pollutant particles that fall within predetermined size ranges relative to the total number of particles in the exhaust gas at any given time. Thus, the particle size distribution module 240 may use this information in combination with the particle count from the particle counter 204 to determine the number of pollutant particles that fall within each of the predetermined size ranges. If the particle size distribution module 240 determines the particle size distribution based on the particle sizes and the particle count, the particle concentration sensor 202 may be omitted. Conversely, if the particle size distribution module 240 determines the particle size distribution based on the particle concentration and the particle count, the particle sizer 206 may be omitted.

The valve control module 248 may adjust the position of the valve 122 to adjust the rate at which dilution gas flows axially into the dilution tunnel 102. Additionally or alternatively, the valve control module 248 may adjust the position of the valve 142 to adjust the rate at which diluted exhaust gas flows through the dilution tunnel 102. Additionally or alternatively, the blower control module 246 may adjust the duty cycle or speed of the diluted exhaust blower 106 to adjust the rate at which the diluted exhaust gas flows through the dilution tunnel 102. The valve control module 248 adjusts the positions of the valves 122, 142 by outputting the valve control signals to the valves 122, 142. The blower control module 246 adjusts the duty cycle or speed of the diluted exhaust blower 106 by outputting one of the blower control signals to the diluted exhaust blower 106.

In one example, the blower control module 246 operates the diluted exhaust blower 106 at a constant speed, and the valve control module 248 adjusts the position of the valve 142 to achieve a target flow rate. The valve control module 248 may accomplish this by adjusting the position of the valve 142 to minimize a difference between the diluted exhaust flow rate measured by the diluted exhaust flow meter 210 and the target flow rate. The target flow rate may be predetermined and/or may be set by the flow control module 244.

The blower control module 246 and the valve control module 248 may control the diluted exhaust blower 106 and the valve 142, respectively, to maintain the diluted exhaust flow rate at the target flow rate for the entire duration of a test schedule. For example, the blower control module 246 may activate the diluted exhaust blower 106 and the valve control module 248 may open the valve 142 when the first test phase of the test schedule begins. Then, when the last test phase of the test schedule ends, the blower control module 246 may deactivate the diluted exhaust blower 106 and the valve control module 248 may close the valve 142. The blower control module 246 and the valve control module 248 may each receive a test phase status signal indicating when each test phase of the test schedule begins and ends and the order of the test phase (first, second, etc.), and therefore indicating when the test schedule begins and ends.

The test phase status signal may be generated by a test schedule execution module (not shown) that executes the test schedule in response to a user input (e.g., a user pressing a button or touching an icon on a touchscreen). The test schedule execution module may be part of the test system control module 200 or be a separate module that communicates with the test system control module 200. The test schedule execution module may store a plurality of test schedules and select a test schedule to execute from the plurality of test schedules based on the user input. Each test schedule may include a predetermined number of test phases. Each test phase may have a predetermined duration and/or specify a target vehicle speed with respect to time.

The test phase status signal may indicate the target vehicle speed with respect to time in addition to indicating when each test phase starts and ends and the order of each test phase. The test schedule module may output the test phase status signal to a powertrain control module (not shown), which may control the engine 114 and/or an electric motor (not shown) to propel a vehicle (not shown) according to the test schedule. The test schedule module may also output the test phase status signal to a dynamometer control module (not shown), which may control a dynamometer (not shown) to adjust a load applied to the engine 114 and/or to wheels of the vehicle. For example, the test phase status signal may also indicate changes in road grade with respect to time, and the dynamometer control module may adjust the load applied to the engine 114 and/or the wheels to simulate those changes in road grade.

The sampling control module 252 coordinates operation of the valve control module 248 and the pump control module 250 to direct sample gas to the sample collectors 144, 154 during each test phase of the test schedule. In addition, the sampling control module 252 coordinates operation of the valve control module 248 and the pump control module 250 to send gas samples from the sample collectors 144, 154, to the emissions analyzer 112 after each test phase. Further, the sampling control module 252 coordinates operation of the valve control module 248 and the pump control module 250 to send purge gas to the sample collectors 144, 154 after gas samples are sent to the emissions analyzer 112. Moreover, the sampling control module 252 coordinates operation of the valve control module 248 and the pump control module 250 to vent gas from the sample collectors 144, 154. The sampling control module 252 may use the test phase status signal to determine when each test phase of the test schedule start and ends.

In the discussion below, the sampling control module 252 opens and closes the valves 134, 146, 150, 158, 162, 166, 178, 180, 192, 194. The sampling control module 252 may accomplish this by outing a signal 256 to the valve control module 248 indicating a desired position (e.g., opened or closed) of each valve. Also, in the discussion below, the sampling control module 252 activates and deactivates the pumps 136, 152, 160, 168, 176, 190. The sampling control module 252 may accomplish this by outing a signal 258 to the pump control module 250 indicating a desired state (e.g., activated or deactivated) of the each pump.

An emissions test schedule may include multiple test phases. For example, the U.S. Environmental Protection Agency (EPA) Federal Test Procedure includes a cold start phase, a cold stabilized phase, and a hot start phase. During each test phase, the sampling control module 252 opens the diluted exhaust extraction valve 134 and activates the diluted exhaust extraction pump 136 to extract a sample of diluted exhaust gas from the dilution tunnel 102. In addition, the sampling control module 252 opens the diluted exhaust fill valve 146 and the sample collector valve 147 to send the diluted exhaust gas sample to the diluted exhaust sample collector 144. The emissions test system 100 may include a plurality of diluted exhaust sample collectors as discussed above, and the sampling control module 252 may direct a diluted exhaust sample to one of the sample collectors during each test phase.

Also, during each test phase, the sampling control module 252 opens the diluent extraction valve 158 and activates the diluent extraction pump 160 to extract a sample of dilution gas from the dilution gas supply line 118. In addition, the sampling control module 252 opens the diluted exhaust fill valve 146 to send the dilution gas sample to the diluent sample collector 154. The emissions test system 100 may include a plurality of diluent sample collectors as discussed above, and the sampling control module 252 may direct a dilution gas sample to one of the sample collectors during each test phase.

In various implementations, the sampling control module 252 may only direct diluted exhaust gas and dilution gas to the diluted exhaust sample collector 144 and the diluent sample collector 154, respectively, when the engine 114 is on during a test phase. However, the sampling control module 252 may direct dilution gas to the sample collectors 144, 154 regardless of whether the engine 114 is on or off at some point in time during the test phase to ensure that the sizes of the samples are sufficient for the emissions analyzer 112. The sample control module 224 may determine this point in time based on the amount of gas collected and the amount of time remaining in the test phase. The sample control module 224 may determine whether the engine 114 is on or off based on an input from the powertrain control module.

After samples are collected, the sample collectors 144, 154, the sampling control module 252 opens the read valves 150, 166 and activates the read pumps 152, 168 to direct the samples to the emissions analyzer 112. Next, the sampling control module 252 activates the purge pump 190 and opens the purge valves 192, 194 to send purge gas to the sample collectors 144, 154. Then, the sampling control module 252 activates the vent pump 176 and opens the vent valves 178, 180 to vent the purge gas from the sample collectors 144, 154.

The fuel type module 242 determines the type of fuel combusted by the engine 114 and outputs a signal 260 indicating the fuel type. The fuel type module 242 may determine the fuel type based on the gaseous emission concentration measured by the gaseous emission concentration sensor 207 using a function or mapping (e.g., a lookup table) that relates gaseous emission concentration to fuel type. To this end, for a given amount of fuel combusted, the combustion of different types of fuel produces different amounts of water concentration. Thus, the gaseous emission concentration sensor 207 may be a water concentration sensor or a humidity sensor, and the fuel type module 242 may determine the fuel type based on the water concentration (or humidity) of the exhaust gas from the engine 114 and the rate at which fuel is delivered to cylinders of the engine 114. In various implementations, the gaseous emission concentration sensor 207 may be disposed in the dilution tunnel 102, and the fuel type module 242 may determine the fuel type based on the water concentration (or humidity) of the mixture of exhaust gas and dilution gas, as well as the rate at which fuel is delivered to cylinders of the engine 114. The fuel type module 242 may receive the fuel delivery rate from the powertrain control module. The gaseous emission concentration sensor 207 may be an absolute humidity sensor or a relative humidity sensor. In the latter case, the emissions test system 100 may include pressure and temperature sensors in the exhaust gas supply line 116 or the dilution tunnel 102, and the fuel type module 242 may determine the absolute humidity in the exhaust gas supply line 116 based on the relative humidity, the pressure, and the temperature measured therein.

In addition, the concentration of gaseous emissions such as carbon dioxide are correlated with the amount of water concentration produced. For example, for a given amount of fuel combusted, combustion of gasoline produces more water concentration (and therefore more carbon dioxide) than combustion of diesel, and combustion of natural gas produces more water concentration (and therefore more carbon dioxide) than combustion of gasoline. Thus, the gaseous emission concentration sensor 207 may be a carbon dioxide sensor, and the fuel type module 242 may determine the fuel type based on the carbon dioxide concentration of the exhaust gas from the engine 114 and the fuel delivery rate. The fuel type module 242 may receive the fuel delivery rate from the powertrain control module.

The flow control module 244 determines a target rate for radial dilution gas flow through the dilution gas supply lines 126 and coordinates operation of the valve control module 248 and the pump control module 250 to achieve the target radial diluent flow rate. The flow control module 244 may determine the target radial diluent flow rate based on the particle size distribution, the fuel type, the gaseous emission concentration, and/or the rate at which fuel is delivered to cylinders of the engine 114. The flow control module 244 may receive the fuel delivery rate from the powertrain control module.

The flow control module 244 may determine a unique target rate for radial dilution gas flow through each of the dilution gas supply lines 126, and the valve control module 248 may adjust the position of a corresponding one of the valves 128 to achieve the target radial diluent flow rate. For example, the flow control module 244 may set the target radial diluent flow rate to a higher value for those of the dilution gas supply lines 126 that are closer to the inlet end 222 of the dilution tunnel 102 where contamination and condensation are a greater concern. Conversely, the flow control module 244 may set the target radial diluent flow rate to a lower value for those of the dilution gas supply lines 126 that are closer to the outlet end 224 of the dilution tunnel 102 where contamination and condensation are a lesser concern.

When a test phase begins, the flow control module 244 may determine the target radial diluent flow rate based on the fuel type and the fuel delivery rate using, for example, a function or mapping that relates fuel type and fuel delivery rate to target radial diluent flow rate. Then, as the test phase progresses, the flow control module 244 may adjust the target radial diluent flow rate based on the fuel delivery rate and/or the particle size distribution. For example, the flow control module 244 may increase the target radial diluent flow rate as the fuel delivery rate and/or the particle size distribution increases, and the flow control module 244 may decrease the target radial diluent flow rate as the fuel delivery rate and/or the particle size distribution decreases.

In another example, the flow control module 244 may use the particle size distribution to determine the total number of pollutant particles that are greater than a predetermined size, and adjust the target radial diluent flow rate based on that total number. For ease of discussion, pollutant particles that are greater than the predetermined size are referred to herein as large pollutant particles. The flow control module 244 may increase the target radial diluent flow rate when the total number of large pollutant particles increases, and the flow control module 244 may decrease the target radial diluent flow rate when the total number of large pollutant particles decreases. The flow control module 244 outputs a signal 262 indicating the target radial diluent flow rate.

The blower control module 246 may control the dilution gas blower 104 to force dilution gas through the dilution gas supply lines 126 at the target radial diluent flow rate. For example, the blower control module 246 may adjust the target duty cycle or or target speed of the dilution gas blower 104 to achieve the target radial diluent flow rate using, for example, a function or mapping that relates target duty cycle or target speed to target radial diluent flow rate. Additionally or alternatively, the valve control module 248 may adjust the target position of the valves 128 to achieve the target radial diluent flow rate using, for example, a function or mapping that relates target valve position to target radial diluent flow rate.

In one example, the blower control module 246 operates the dilution gas blower 104 at a constant speed, and the valve control module 248 adjusts the positions of the valves 128 to achieve the target radial diluent flow rate. The valve control module 248 may adjust the positions of the valves 128 to minimize a difference between the radial diluent flow rate measured by the radial diluent flow meter 209 and the target radial diluent flow rate. The blower control module 246 controls the duty cycle or speed of the dilution gas blower 104 by outputting one of the blower control signals to the dilution gas blower 104. The valve control module 248 controls the positions of the valves 128 by outputting the valve control signals to the valves 128.

Diluted exhaust gas may be drawn through the dilution tunnel 102 at a constant rate. Thus, the sum of the rate of axial diluent flow to the dilution tunnel 102 and the rate of radial diluent flow to the dilution tunnel 102 may remain constant, or nearly constant, provided that the rate of exhaust flow to the dilution tunnel 102 remains relatively constant. Therefore, when the flow control module 244 adjusts the rate of radial diluent flow to the dilution tunnel 102, the flow control module 244 adjusts the rate of axial diluent flow to the dilution tunnel 102 by an equal and opposite amount.

The flow control module 244 may adjust the rate of dilution gas flow in the radial direction through each of the dilution gas supply lines 126 by the same amount in response to a change in the particle concentration, the particle sizes, the gaseous emission concentration, the fuel type, and/or the fuel delivery rate. For example, the signal 262 output by the flow control module 244 may indicate the target rate for the total amount of radial diluent flow through the dilution gas supply lines 126, and the valve control module 248 may adjust the position of each of the valves 128 by the same amount to achieve the target rate. Alternatively, the signal 262 may indicate a target rate of radial diluent flow through each of the dilution gas supply lines 126, and the valve control module 248 may adjust the positions the valves 128 by different amounts to achieve the target rates.

Figure 4:
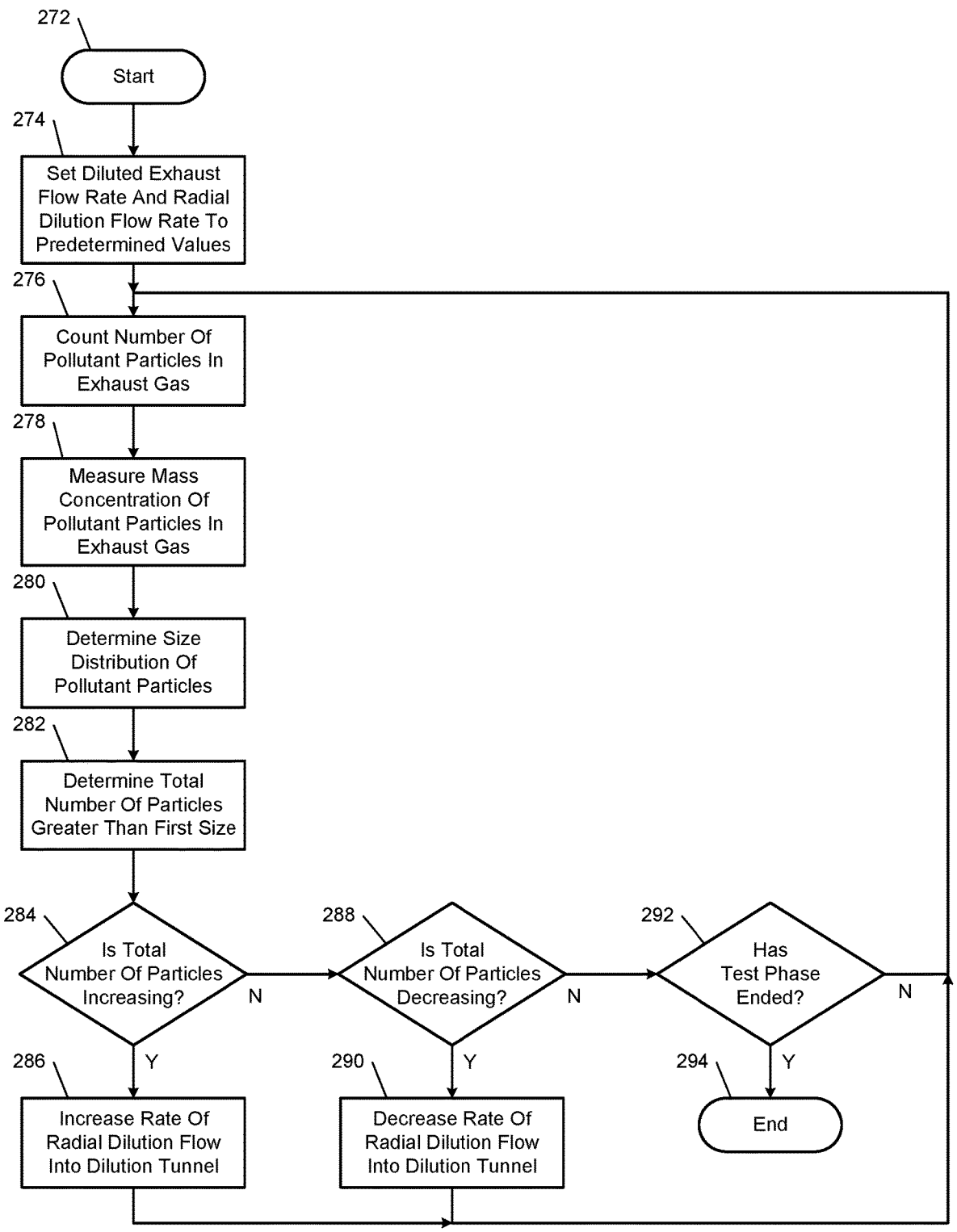
FIGS. 4 and 5 are flowcharts illustrating example methods for controlling the flow rate of dilution air through a porous wall of a dilution tunnel in an exhaust sampling system.

Referring now to FIG. 4, an example method for controlling the rate of radial dilution gas flow through the inner pipe 216 of the dilution tunnel 102 begins at 272, which may also represent the start of a test phase. At 274, the flow control module 244 sets the target rate of diluted exhaust gas flow through the dilution tunnel 102 and the target rate of radial dilution gas flow through the dilution gas supply lines 126 to predetermined values. The flow control module 244 may select the predetermined values from a plurality of predetermined values based on the type of fuel combusted by the engine 114 and/or the rate at which fuel is delivered to cylinders of the engine 114.

At 276, the particle counter 204 counts the number of pollutant particles in exhaust gas flowing through the exhaust gas supply line 116. At 278, the particle concentration sensor 202 measures the mass concentration of particles in exhaust gas flowing through the exhaust gas supply line 116. At 280, the particle size distribution module 240 determines the distribution of the sizes of pollutant particles in exhaust gas flowing through the exhaust gas supply line 116 based on the particle count and the particle mass concentration.

At 282, the particle size distribution module 240 or the flow control module 244 determines the total number of pollutant particles that are greater than a first size based on the particle size distribution. In various implementations, the particle size distribution may consist of the total number of pollutant particles that are greater than the predetermined size. The first size may be predetermined. Alternatively, the particle size distribution module 240 or the flow control module 244 may determine the first size based on the target flow rate of diluted exhaust gas flow through the dilution tunnel 102. For ease of discussion, the pollutant particles that are greater than the first size are referred to herein as large pollutant particles.

At 284, the flow control module 244 determines whether the total number of large pollutant particles is increasing. For example, the flow control module 244 may determine whether the total number of large pollutant particles determined in a current iteration is greater than the total number of large pollutant particles determined in a previous iteration. When the test phase starts, the flow control module 244 may set the target radial diluent flow rate to a predetermined value that is selected from a plurality of predetermined values based on an assumed total number of large pollutant particles. Thus, in the first iteration, the flow control module 244 may determine that the total number of large pollutant particles is increasing if the determined total number of large pollutant particles is greater than the assumed total number of large pollutant particles. If the total number of large pollutant particles is increasing, the method continues at 286. Otherwise, the method continues at 288. At 286, the flow control module 244 increases the target rate of radial dilution gas flow through the dilution gas supply lines 126 to increase the rate of radial dilution gas flow into the dilution tunnel 102.

At 288, the flow control module 244 determines whether the total number of large pollutant particles is decreasing. For example, the flow control module 244 may determine whether the total number of large pollutant particles determined in a current iteration is less than the total number of large pollutant particles determined in a previous iteration. In the first iteration, the flow control module 244 may determine that the total number of large pollutant particles is decreasing if the total number of large pollutant particles determined in the first iteration is less than the assumed total number of large pollutant particles. If the total number of large pollutant particles is decreasing, the method continues at 290. Otherwise, the method continues at 292. At 290, the flow control module 244 decreases the target rate of radial dilution gas flow through the dilution gas supply lines 126 to decrease the rate of radial dilution gas flow into the dilution tunnel 102.

At 292, the flow control module 244 determines whether the test phase has ended. The flow control module 244 may use the test phase status signal (FIG. 3) to determine when each test phase of the test schedule start and ends. If the test phase has ended, the method ends at 294. Otherwise, the method returns to 276.

Figure 5:
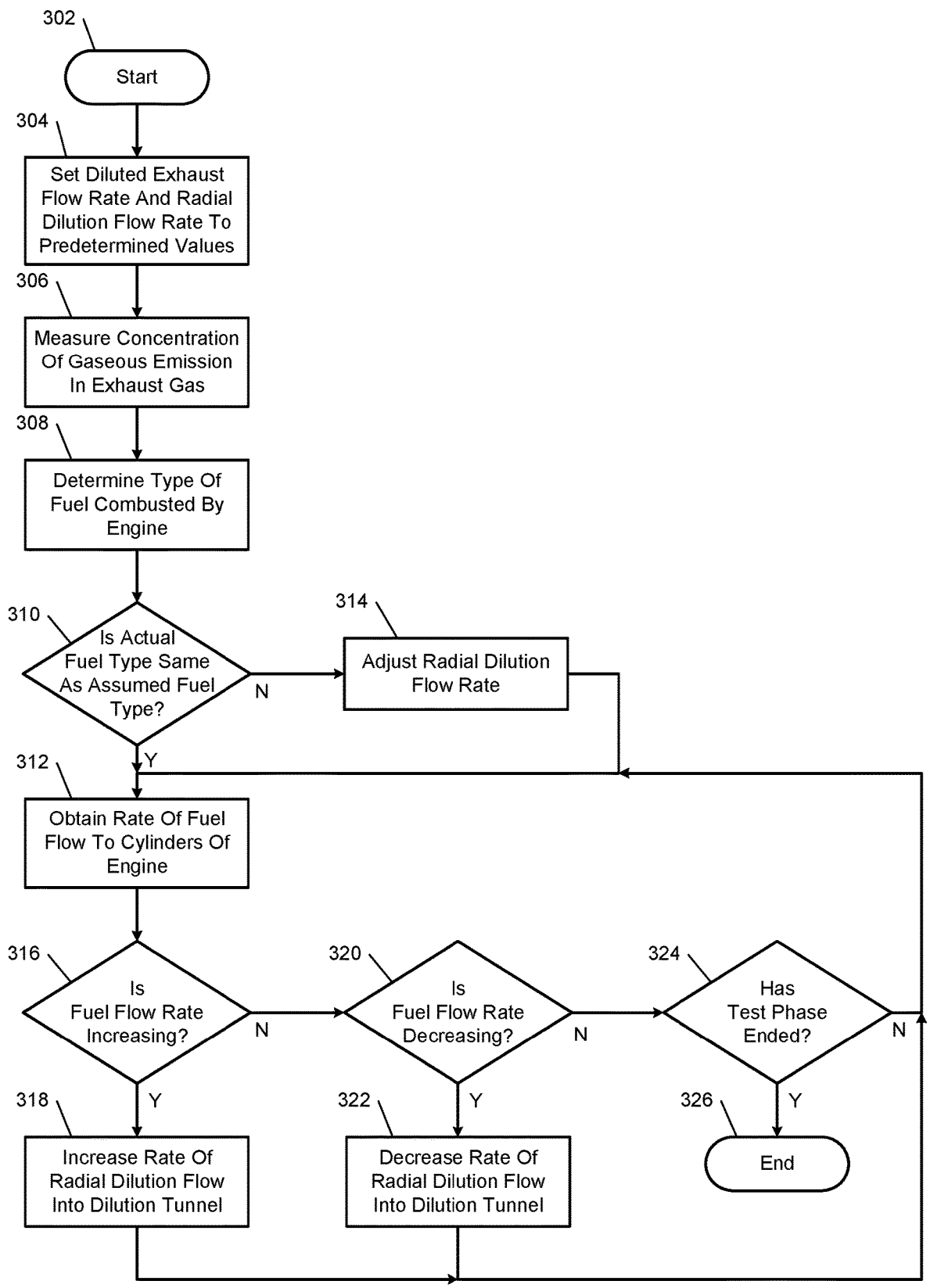

Referring now to FIG. 5, another example method for controlling the rate of radial dilution gas flow through the inner pipe 216 of the dilution tunnel 102 begins at 302, which may also represent the start of a test phase. At 304, the flow control module 244 sets the target rate of diluted exhaust gas flow through the dilution tunnel 102 and the target rate of radial dilution gas flow through the dilution gas supply lines 126 to predetermined values. The flow control module 244 may select the predetermined values from a plurality of predetermined values based on an assumed type of fuel combusted by the engine 114 and/or an assumed rate of fuel delivery or fuel flow to cylinders of the engine 114.

At 306, the gaseous emission concentration sensor 207 measures the concentration of a gaseous emission (e.g., carbon dioxide) in exhaust gas flowing through the exhaust gas supply line 116. At 308, the fuel type module 242 determines the actual type of fuel combusted by the engine 114 based on the gaseous emission concentration. For example, the fuel type module 242 may determine that the actual fuel type is diesel if the carbon dioxide ($CO_2$) concentration is within a first predetermined range, determine that the actual fuel type is gasoline if the $CO_2$ concentration is within a second predetermined range, and determine that the actual fuel type is natural gas if the $CO_2$ concentration is within a third predetermined range. The lower limit of the second predetermined range may be greater than the upper limit of the first predetermined range, and the lower limit of the third predetermined range may be greater than the upper limit of the second predetermined range.

At 310, the flow control module 244 determines whether the actual fuel type is the same as the assumed fuel type. If the actual fuel type is the same as the assumed fuel type, the method continues at 312. Otherwise, the method continues at 314. At 314, the flow control module 244 adjusts the target rate of radial dilution gas flow through the dilution gas supply lines 126 to adjust the rate of radial dilution gas flow into the dilution tunnel 102. For example, if the assumed fuel type is diesel and the actual fuel type is gasoline, the flow control module 244 may increase the target radial diluent flow rate. Conversely, if the assumed fuel type is gasoline and the actual fuel type is diesel, the flow control module 244 may decrease the target radial diluent flow rate.

At 312, the flow control module 244 obtains the rate of fuel flow or fuel delivery to cylinders of the engine 114. As indicated above, the flow control module 244 may receive the fuel flow rate from the powertrain control module. At 316, the flow control module 244 determines whether the fuel flow rate is increasing. For example, the flow control module 244 may determine whether the fuel flow rate obtained in a current iteration is greater than the fuel flow rate obtained in a previous iteration. As indicated above, when the test phase starts, the flow control module 244 may set the target radial diluent flow rate to a predetermined value that is selected from a plurality of predetermined values based on an assumed fuel flow rate. Thus, in the first iteration, the flow control module 244 may determine that the fuel flow rate is increasing if the fuel flow rate obtained in the first iteration is greater than the assumed fuel flow rate. If the fuel flow rate is increasing, the method continues at 318. Otherwise, the method continues at 320. At 318, the flow control module 244 increases the target rate of radial dilution gas flow through the dilution gas supply lines 126 to increase the rate of radial dilution gas flow into the dilution tunnel 102.

At 320, the flow control module 244 determines whether the fuel flow rate is decreasing. For example, the flow control module 244 may determine whether the fuel flow rate obtained in a current iteration is less than the fuel flow rate obtained in a previous iteration. In the first iteration, the flow control module 244 may determine that the fuel flow rate is decreasing if the fuel flow rate obtained in the first iteration is less than the assumed fuel flow rate. If the fuel flow rate is decreasing, the method continues at 322. Otherwise, the method continues at 324. At 322, the flow control module 244 decreases the target rate of radial dilution gas flow through the dilution gas supply lines 126 to decrease the rate of radial dilution gas flow into the dilution tunnel 102.

At 324, the flow control module 244 determines whether the test phase has ended. The flow control module 244 may use the test phase status signal (FIG. 3) to determine when each test phase of the test schedule start and ends. If the test phase has ended, the method ends at 326. Otherwise, the method returns to 312.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An emissions test system comprising:
   a dilution tunnel in which exhaust gas is mixed with dilution gas, wherein the dilution tunnel is configured to receive dilution gas flowing in an axial direction relative to the dilution tunnel and dilution gas flowing in a radial direction relative to the dilution tunnel; and
   a flow control module configured to adjust the rate of the dilution gas flow in the radial direction based on at least one of a concentration of pollutant particles in the exhaust gas, a size of pollutant particles in the exhaust gas, a concentration of a gaseous emission in the exhaust gas, a type of fuel combusted by an engine producing the exhaust gas, and a rate of fuel flow to cylinders of the engine.

2. The emissions test system of claim 1 wherein the flow control module is configured to adjust the rate of the dilution gas flow in the radial direction based on the concentration of pollutant particles in the exhaust gas.

3. The emissions test system of claim 2 wherein the flow control module is configured to:
   increase the rate of the dilution gas flow in the radial direction when the concentration of pollutant particles in the exhaust gas increases; and
   decrease the rate of the dilution gas flow in the radial direction when the concentration of pollutant particles in the exhaust gas decreases.

4. The emissions test system of claim 1 wherein the flow control module is configured to adjust the rate of the dilution gas flow in the radial direction based on a total number of pollutant particles in the exhaust gas having a size greater than a predetermined size.

5. The emissions test system of claim 4 wherein the flow control module is configured to:
   increase the rate of the dilution gas flow in the radial direction when the total number of pollutant particles in the exhaust gas increases; and
   decrease the rate of the dilution gas flow in the radial direction when the total number of pollutant particles in the exhaust gas decreases.

6. The emissions test system of claim 1 wherein the flow control module is configured to adjust the rate of the dilution gas flow in the radial direction based on the type of fuel combusted by the engine.

7. The emissions test system of claim 6 wherein the flow control module is configured to:
   adjust the rate of the dilution gas flow in the radial direction to a first value when a first type of fuel is combusted by the engine; and
   adjust the rate of the dilution gas flow in the radial direction to a second value that is greater than the first value when a second type of fuel is combusted by the engine, wherein combustion of the second type of fuel produces more water per mass of fuel combusted relative to combustion of the first type of fuel.

8. The emissions test system of claim 1 wherein the flow control module is configured to adjust the rate of the dilution gas flow in the radial direction based on the rate of fuel flow to the cylinders.

9. The emissions test system of claim 8 wherein the flow control module is configured to:
   increase the rate of the dilution gas flow in the radial direction when the rate of fuel flow to the cylinders increases; and
   decrease the rate of the dilution gas flow in the radial direction when the rate of fuel flow to the cylinders decreases.

10. The emissions test system of claim 1 wherein the dilution tunnel includes an inner pipe and an outer pipe surrounding the inner pipe, the inner pipe having an inlet end configured to receive the dilution gas flowing in the axial direction, the inner pipe having pores extending through the inner pipe in the radial direction and configured to receive the dilution gas flowing in the radial direction.

11. The emissions test system of claim 10 wherein the dilution tunnel further includes an orifice plate disposed at the inlet end thereof and defining an orifice through which the dilution gas flowing in the axial direction passes.

12. The emissions test system of claim 10 further comprising a plenum configured to deliver the dilution gas flowing in the radial direction through the outer pipe.

13. The emissions test system of claim 12 wherein the plenum includes:
   at least one line extending in the radial direction to the outer pipe; and
   at least one valve disposed in the at least one line, wherein the flow control module is configured to adjust the position of the at least one valve to adjust the rate of dilution gas flow in the radial direction through the at least one line.

14. The emissions test system of claim 13 wherein:
   the at least one line includes a plurality of lines extending in the radial direction to the outer pipe; and
   the at least one valve includes a plurality of valves that are each disposed in one of the plurality of lines, wherein the flow control module is configured to adjust the positions of the plurality of valves to adjust the rates of dilution gas flow in the radial direction through the plurality of lines.

15. The emissions test system of claim 14 wherein the flow control module is configured to adjust the rate of dilution gas flow in the radial direction through each line in the plurality of lines by the same amount in response to a change in at least one of the concentration of pollutant particles in the exhaust gas, the size of pollutant particles in the exhaust gas, the concentration of the gaseous emission in the exhaust gas, the type of fuel combusted by the engine, and the rate of fuel flow to cylinders of the engine.

16. An emissions test method comprising:
delivering exhaust gas to a dilution tunnel;
delivering dilution gas to the dilution tunnel in an axial direction relative to the dilution tunnel;
delivering dilution gas to the dilution tunnel in a radial direction relative to the dilution tunnel; and
adjusting the rate of the dilution gas flow in the radial direction based on at least one of a concentration of pollutant particles in the exhaust gas, a size of pollutant particles in the exhaust gas, a concentration of a gaseous emission in the exhaust gas, a type of fuel combusted by an engine producing the exhaust gas, and a rate of fuel flow to cylinders of the engine.

17. The emissions test method of claim 16 further comprising adjusting the rate of the dilution gas flow in the radial direction based on the concentration of pollutant particles in the exhaust gas.

18. The emissions test method of claim 17 further comprising:
increasing the rate of the dilution gas flow in the radial direction when the concentration of pollutant particles in the exhaust gas increases; and
decreasing the rate of the dilution gas flow in the radial direction when the concentration of pollutant particles in the exhaust gas decreases.

19. The emissions test method of claim 16 further comprising adjusting the rate of the dilution gas flow in the radial direction based on a total number of pollutant particles in the exhaust gas having a size greater than a predetermined size.

20. The emissions test method of claim 19 further comprising:
increasing the rate of the dilution gas flow in the radial direction when the total number of pollutant particles in the exhaust gas increases; and
decreasing the rate of the dilution gas flow in the radial direction when the total number of pollutant particles in the exhaust gas decreases.

21. The emissions test method of claim 16 further comprising adjusting the rate of the dilution gas flow in the radial direction based on the type of fuel combusted by the engine.

22. The emissions test method of claim 21 further comprising:
adjusting the rate of the dilution gas flow in the radial direction to a first value when a first type of fuel is combusted by the engine; and
adjusting the rate of the dilution gas flow in the radial direction to a second value that is greater than the first value when a second type of fuel is combusted by the engine, wherein combustion of the second type of fuel produces more water per mass of fuel combusted relative to combustion of the first type of fuel.

23. The emissions test method of claim 16 further comprising adjusting the rate of the dilution gas flow in the radial direction based on the rate of fuel flow to the cylinders.

24. The emissions test method of claim 23 further comprising:
increasing the rate of the dilution gas flow in the radial direction when the rate of fuel flow to the cylinders increases; and
decreasing the rate of the dilution gas flow in the radial direction when the rate of fuel flow to the cylinders decreases.

25. The emissions test method of claim 16 further comprising:
delivering dilution gas through a plurality of lines extending in the radial direction to the dilution tunnel and spaced apart from one another in the axial direction relative to the dilution tunnel; and
adjusting the rate of dilution gas flow in the radial direction through each line in the plurality of lines by the same amount in response to a change in at least one of the concentration of pollutant particles in the exhaust gas, the size of pollutant particles in the exhaust gas, the concentration of the gaseous emission in the exhaust gas, the type of fuel combusted by the engine, and the rate of fuel flow to cylinders of the engine.

* * * * *